Jan. 8, 1952 W. S. FINKEN ET AL 2,582,113
DELAY OPENING PARACHUTE PACK AND RELEASING
ASSEMBLY THEREFOR
Filed Nov. 13, 1947 5 Sheets-Sheet 3

INVENTOR.
LEONARD P. FRIEDER
WALTER S. FINKEN
BY
ATTORNEY

Jan. 8, 1952     W. S. FINKEN ET AL     2,582,113
DELAY OPENING PARACHUTE PACK AND RELEASING
ASSEMBLY THEREFOR

Filed Nov. 13, 1947     5 Sheets-Sheet 4

INVENTOR.
LEONARD P. FRIEDER
WALTER S. FINKEN
BY
ATTORNEY

Patented Jan. 8, 1952

2,582,113

UNITED STATES PATENT OFFICE 2,582,113

DELAY OPENING PARACHUTE PACK AND RELEASING ASSEMBLY THEREFOR

Walter S. Finken, Brooklyn, and Leonard P. Frieder, Great Neck, N. Y., assignors, by mesne assignments, to the Reconstruction Finance Corporation, Philadelphia, Pa., a corporation of the United States Application November 13, 1947, Serial No. 786,861

16 Claims. (Cl. 244—150)

Our invention relates to a delay opening parachute pack and releasing assembly therefor.

It is frequently desirable to drop equipment, apparatus or the like from rapidly moving airplanes by means of parachutes. It is well known that in order to preclude the fouling of the parachute upon the airplane or parts thereof it cannot be opened until it is clear of the airplane and its slip stream. This is usually accomplished by means of a static line which permits the parachute pack to fall a predetermined distance from the airplane before the pack is opened.

With high-speed planes, however, the velocity of the plane is such that initially the parachute pack is traveling at substantially the same speed as the plane, which speed is so high as to introduce opening shocks which may cause parachute failures due to the imposition of abnormal stresses.

These stresses may be successfully overcome by the use of a parachute having a hemispherical canopy and a floating hem cord such as described in U. S. patent to Walter S. Finken 2,412,392 dated December 10, 1946.

Where, however, delicate instruments are being dropped, it is imperative that the velocity of the pack be reduced before the parachute is opened in order to reduce to a minimum opening shocks which might serve to derange the relatively delicate instruments to be borne by the parachute. For example, there has been developed a radio signaling assembly adapted to transmit radio signals in response to the barometric pressure, the temperature, wind velocity, and the humidity of the atmosphere. These instruments are employed to obtain weather reports over otherwise inaccessible territory which is not adequately covered by ground stations as, for example, over oceans and in the polar regions. The importance of correct weather data for transoceanic flights cannot be overemphasized. One small airline, for example, making six flights a week between New York and a European port has estimated that by reducing the flight time 25 minutes a saving of about $12,000 a month would result principally from fuel economy. The decrease in fuel consumption serves to increase the payload which may be carried in lieu of fuel.

The present system of obtaining weather data employs reports based on personal observations of pilots which information is either incorrect in whole or in part with the result that meteorologists attempt to predict the weather over the route upon data which is frequently conjectural. Airplanes accordingly fly a northern course until bad weather is encountered and are then directed to a southern course. The meteorologists have no means of knowing how long the bad weather existing on the northern course will continue and hence redirect ships to fly the northern course based largely on conjecture.

By the use of the radio weather equipment, transatlantic airplanes may fly the extreme northern course. The pilots may drop radio weather data equipment periodically which will enable meteorologists to predict the weather with a high degree of accuracy, eliminating all conjecture. This method is of high importance not only in civilian aviation but in military uses. It is understood, of course, that absolute reliability is of paramount importance. In order to obtain this reliability, it is necessary that this equipment function at each drop. We have found that we are able to drop sensitive radio weather data gathering equipment by means of the delay opening parachute pack which is the subject of this invention.

One object of our invention is to provide a parachute pack which will open only at a predetermined time after being dropped from an airplane within the limits of the time delay mechanism.

Aanother object of our invention is to provide a novel time delay mechanism which is inexpensive to manufacture and certain in its operation.

Another object of our invention is to provide a time delay parachute pack having a release assembly with few moving parts.

Another object of our invention is to provide a time delay parachute pack employing a powder train, the time of burning of which determines the time of the opening of the pack.

Other and further objects of our invention will appear in the following description.

For purposes of illustration and not by way of limitation, we will describe our invention as applied to a radio weather gathering instrument adapted to transmit signals relating to information of use to meteorologists, such as the barometric pressure, the temperature of the atmosphere, the velocity of the wind, the humidity of the air and the like. It is to be understood, however, that our time delay parachute pack may be employed for any purpose where it is desired to delay the opening of the parachute for a predetermined interval of time after it is dropped from an airplane.

In the accompanying drawings which form part of the instant specification and which are to be read in conjunction therewith and in which like reference numerals are used to indicate like parts in the various views:

Figure 18 is a fragmentary sectional view showing another construction for the trigger release mechanism.

In general, our invention contemplates provision of a parachute pack releasably held in a pack by a securing member part of which may be combustible or fusible. The combustible or fusible portion of the securing assembly is placed adjacent to a powder pellet assembled in a fuse. A static line is attached to the airplane from which our assembly is to be dropped. A pilot parachute is released by the tug of the static line whic halso functions to operate the trigger mechanism firing a percussion fuse adapted to ignite the powder train. The powder train is so designed as to give the required time delay and then burn or melt the combustible or fusible section of the securing assembly. A backing powder pellet is employed to insure sufficient heat to complete the burning or melting of the securing means. As soon as the securing means is reelased by the burning or melting, pack opens and releases a main parachute. In the case of radio weather gathering instruments, means are provided in the suspension for a radio antenna and for initiating the action of the instrument.

Figures 1, 1B:
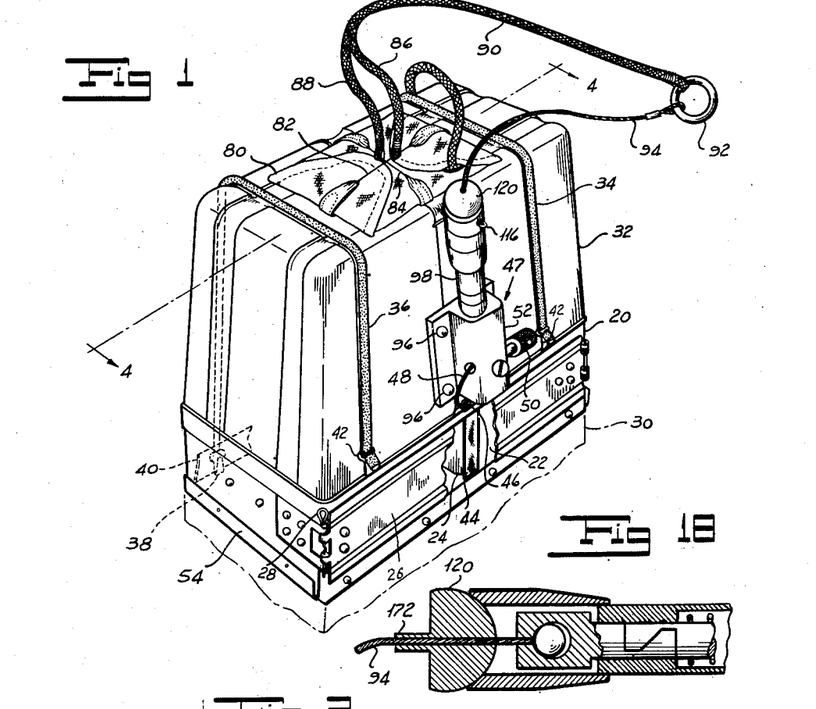
Figure 1 is a perspective view of a parachute pack assembly showing one embodiment of our invention.
Figure 4:
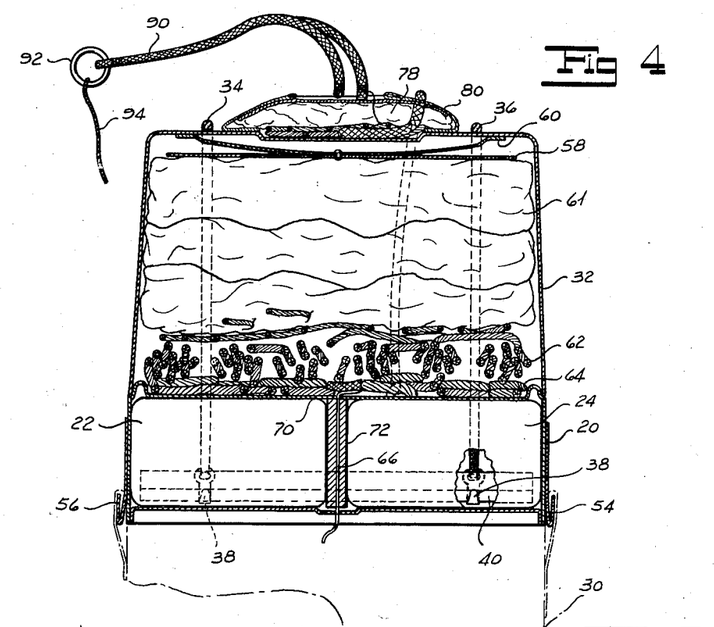
Figure 4 is a sectional view drawn on an enlarged scale taken on the line 4—4 of Figure 1.

More particularly, referring now to the drawings, the parachute pack may be of any suitable design or construction. As shown in Figure 1, it comprises a base member 20 formed with a pair of compartments 22 and 24 adapted to be closed by a door 26 secured by a pin 28, which compartments, 22 and 24, are adapted to house batteries for the radio equipment which forms no part of the instant invention and which is housed in a container diagrammatically shown and indicated by the reference numeral 30. The base member 20 may be formed of sheet metal, plastic or the like. A box shaped member 32 encloses the parachute assembly and is held secured to the base 20 by means of a plurality of elastic members 34 and 36. The rear ends of elastic members are provided with hooks 38 adapted to hook under strip 40 carried by the rear side of the base 20 as can readily be seen by reference to Figures 1 and 4. The front ends of elastic members 34 and 36 are provided with hooks 42 adapted to hook under the front edge of the cover 32. A fabric strip 44 terminating in a loop 46 is firmly secured to the floor of the base 20. Secured to the side of the cover 32 we provide a time delay fuse assembly indicated generally by the reference numeral 47. A securing member 48 which may be either combustible or formed with a fusible section has one end thereof secured to a tensioning screw 50 and the other end secured to the body 52 of the fuse 47. The securing member 48 passes through the fabric loop 46 and firmly fastens the front edge of the cover 32 to the base. The elastic members 34 and 36 hold the rear edge of the pack cover 32 to the base. It will be seen that if the securing member 48 is ruptured the elastic members will pivot the pack cover 32 upwardly around its rear edge under the influence of the elastic members 34 and 36.

The instrument casing 30 is secured to the base 20 in any suitable manner as for example by means of flanges 54 and 56.

Figure 9:
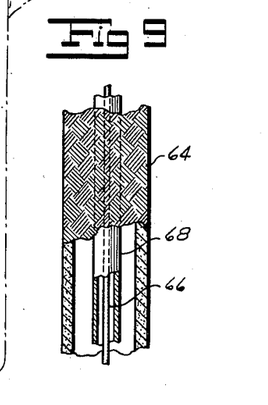
Figure 9 is a fragmentary elevation with parts and section, showing the construction of the main supporting cable.
Figure 10:
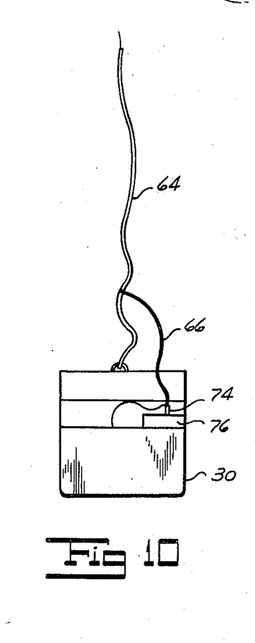
Figure 10 is a diagrammatic fragmentary view showing the position of parts just prior to the opening of the main parachute.
Figure 11:
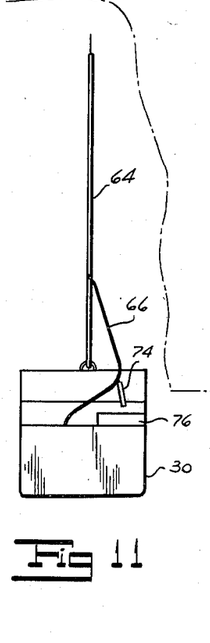
Figure 11 is a view similar to Figure 10 showing the position of parts after the main parachute has opened.

Within the pack cover 32, we provide a plate 58 normally pressed downwardly by a spring 60 to assist in expelling the parachute 61 from the pack. The parachute, which may be of any suitable type, is folded within the pack for ready streaming, the shroud lines 62 thereof being coiled for free running. In the case of radio equipment a long supporting line or cable 64 is provided made of nylon braid or any other suitable material. Within the cable, we provide an antenna wire 66 provided with suitable insulating cover 68 as can readily be seen by reference to Figure 9. The lower end of the supporting cable 64 is firmly secured to an eye 70 supported by a post 72 which is formed with an opening through which the lower end of the antenna 66 passes. A branch cord 66 leaves the main supporting cable above the point of attachment as shown in Figures 10 and 11. In these two views, the tensioning of the cable 64 occasioned by the oepning of the parachute canopy acts to operate member 74 to actuate a switch indicated by the reference numeral 76 to initiate the operation of the instrument.

A pilot parachute 78 is housed within a cover member 80 secured to the top of the pack cover. The pilot parachute cover is normally held in closed position by a pair of frangible cords 82 and 84 to which branches 86 and 88 of the bifurcated end of a static line 90 are attached. The end of the static line 90 terminates in a ring 92 to which the trigger lanyard 94 of the fuse assembly is also attached. Upon the pulling of the ring 92, the pilot parachute will be released by the rupture of the frangible cords 82 and 84 and the firing pin of the fuse will be actuated by the lanyard 94.

Figure 2:
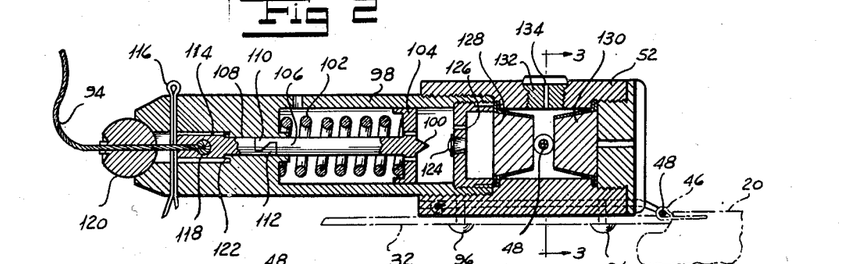
Figure 2 is a sectional elevation of the delay action fuse adapted to release the parachute pack shown in Figure 1.

Referring now to Figure 2, the fuse body 52 is secured to the side of the pack cover 32 in any appropriate manner as for example by rivets 96. Threadedly lodged within the fuse body, we provide a firing mechanism housing 98 comprising a firing pin 100 and a firing pin spring 102. The firing pin 100 carries a flange 104 against which the lower end of the firing pin spring 102 seats. A pull rod 106 terminates in an end 110 interengaging an end 112 formed on a trigger rod 114, which interfitting ends are positioned in a bore 108. The interengaging surfaces are inclined tending to move trigger end 112 to disengage firing pin rod end 110. The disengaging movement is prevented by the walls of the bore 108. A cotter safety pin 116 prevents the movement of the trigger rod 114. A lanyard 94 is secured to the trigger rod 114 by means of an enlarged portion 118 or in any other suitable manner. A sealing ball 120 is secured to the lanyard 94 and is adapted to seal the interior of the trigger mechanism. The ball also insures trigger release when the lanyard is pulled at an angle, the ball and its seat acting as a fair lead.

The bore 108 terminates in an enlarged bore 122. The pistol is fired when the interengaging ends of the trigger rod and the firing pin rod are pulled by the lanyard 94 into the area of the bore enlargement 122. This action is permitted only by compressing the firing spring 102. The pressure of the spring is such as to cam the trigger rod away from the firing pin in the area of the bore enlargement, releasing the firing pin to stike a percussion cap 124, thus igniting a powder pellet 128 which will burn with a predetermined time delay depending on the composition of the powder, the pressure with which it is packed, and the altitude at which our assembly is released. A vent 126 permits the gases to escape and prevents the building up of pressure from the gases of combustion. By changing the pellet 128, varying delay times may be attained. Powder pellet 128, for example, which gives a delay of 2.8 seconds on the ground will give a delay of 4.8 seconds at 10,000 feet elevation and a delay of 6.9 seconds at 16,000 feet. The altitude of release, therefore, must be taken into consideration as well as the type of pellet in determining the desired delay. The securing cord 48, which may be made of nylon or similar strong and combustible material, is placed adjacent the pellet 128 so that the flare from this pellet will burn the cord. A backing pellet 130 is adapted to be ignited from the flare of pellet 128 to insure complete combustion of the securing cord 48 in order to release the assembly. A plug 132 provided with a vent 134 is positioned in the area between pellets to permit burning powder gases to escape in order to insure that a building up of the pressure as a result of the gases of combustion will not reduce the desired delay time.

Figure 3:
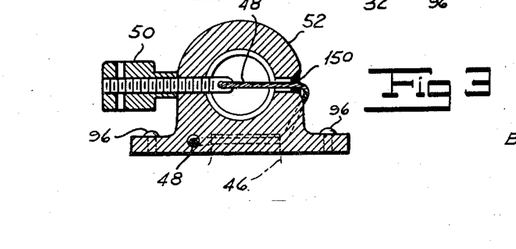
Figure 3 is a sectional view taken on the line 3—3 of Figure 2.
Figures 13, 14, 15, 16, 17:
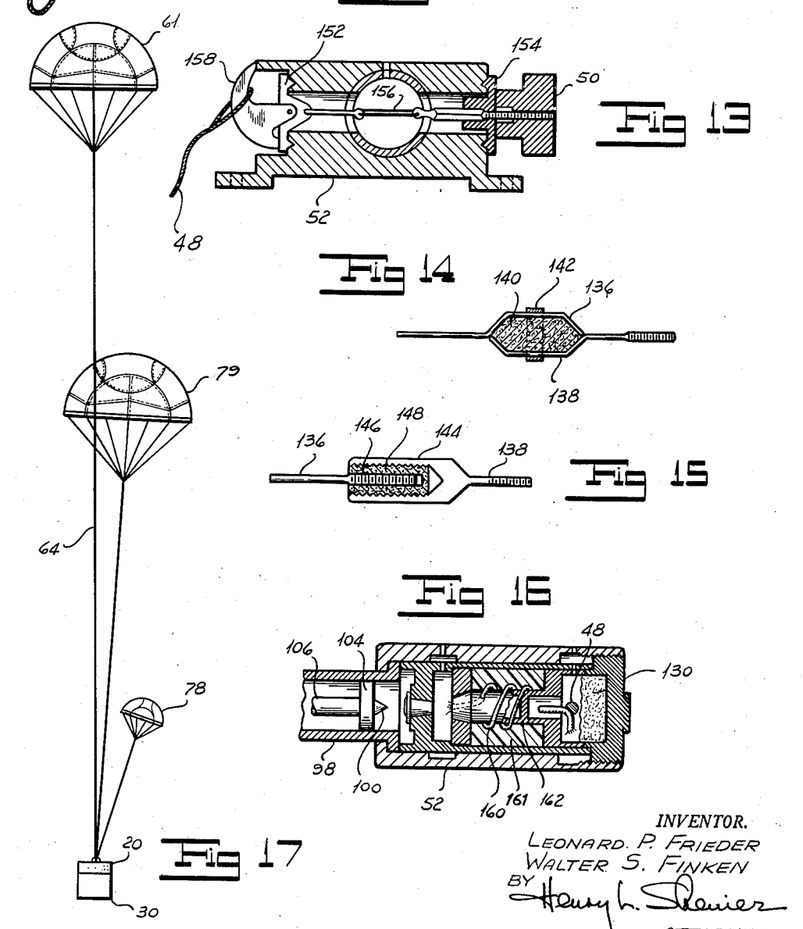
Figure 13 is a sectional view taken along the line 13—13 of Figure 12.
Figure 14 is a view of a detail showing a modified form of fusible connection.
Figure 15 is a view of a detail showing another form of fusible connection adapted to be employed in our assembly.
Figure 16 is a fragmentary sectional view showing another construction of a delay action fuse in which the time delay may be readily varied.
Figure 17 is an elevation drawn on a small scale showing a plurality of parachute streamed sequentially by a fuse of the type shown in Figure 12.

If desired, instead of a combustible cord such as shown in Figures 2 and 3, we may employ a fusible material such as low melting point alloy. In Figure 14, for example, a wire 136 and a wire 138 are secured to each other by means of a mass of low melting point alloy 140 and a ring 142. When the alloy 140 melts under the influence of the heat of combustion of the pellet 128 and the pellet 130, the wires 136 and 138 part, thus releasing the pack. In Figure 15, a ferrule 144 is secured to one wire 138. The other wire 136 terminates in a threaded portion 146 lodged in a mass of low melting alloy 148 externally threaded to the internal threads formed on the ferrule 144. Upon the melting of the mass of alloy 148, the wires 136 and 138 are permitted to part.

In the form of the invention shown in Figures 1, 2 and 3, we provide a wax seal 150 to prevent moisture from entering into the inter-pellet space. This space may be sealed by the embodiment we have shown in Figure 13. A sealing plate 152 and a sealing plate 154 seal this space. The plates are held together by means of a loop 156 of combustible material, such as nylon cord. The securing line 48 has its end passed over a pivoted member 158 carried by the sealing plate 154. Upon the burning of the cord, the member 158 will pivot to release the securing line 48 to permit the parachute pack to open.

In the form of the invention shown in Figure 16, instead of pellet 128, we employ a length of Ensign Bickford fuse, or the like, 160 which is wound around a supporting tube 162 adapted to ignite the backing pellet 130 in order to sever the latching cord 48. It will be readily seen that the length of the Ensign Bickford fuse may be readily varied and thus the time of burning may be easily controlled. The fuse is lodged in a mass of rosin or wax 161, which serves to hold the fuse 160 in place and insures the proper delay time by causing the fuse to burn through a core and prevents short circuits.

Figure 12:
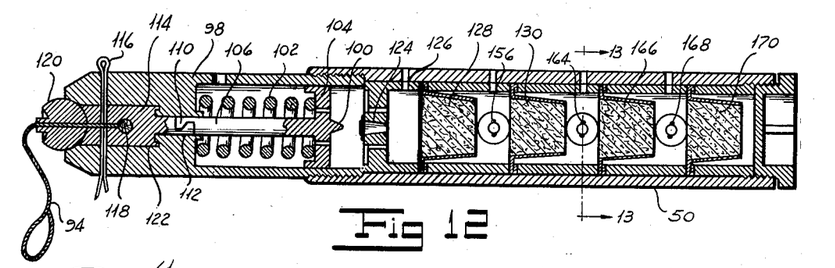
Figure 12 is a sectional view similar to Figure 2 showing a time delay fuse for a series of sequential operations.

In the form of the invention shown in Figure 12, the first pellet 128 corresponds to the pellet 128 shown in Figure 2. The backing pellet 130, however, is also a transmission pellet serving to control the time of release of a second securing cord 164, which is severed by the action of the pellet 130 and the flame from a third pellet 166. This pellet in turn acts as a transmission pellet for a third severable member 168 as well as the backing pellet to insure the combustion of the securing cord 164. The third pellet 166 is adapted to ignite the pellet 170 which serves as the backing pellet for the combustible cord 168.

Referring now to Figure 18, we have shown a modification of the trigger release in which a boss 172 is turned upon the sealing ball 120 so that it may be compressed over the lanyard 94. We are thus enabled more readily to assemble the trigger lanyard to insure that the ball 120 will make a water-tight joint.

We will describe the operation of our assembly for purposes of illustration in connection with a device for obtaining meteorological data in connection with the appraisal of weather conditions over transoceanic airplane routes. A plurality of assemblies attached to our delay opening parachute packs equipped with our invention are carried by an airplane which flies a transoceanic route. The airplane, for example, may be flying at an altitude of 20,000 feet and is equipped with a special air lock tube which forms no part of the instant invention. The air lock tube requires the use of a very short static line to the end of which ring 92 is attached. The air lock tube is such that it will permit a bottom hatch to be closed while the hatch within a plane is opened. The unit is suspended within this tube and the upper hatch is then closed. The bottom hatch is opened for a period of time before the drop, say thirty minutes, to permit the stabilization of the instruments and the humidity elements of the instrument to be carried by the parachute as well as the other instruments for measuring barometric pressures and humidity. By this procedure, the instrument will be able to transmit correct readings as soon as it is rendered operative upon its discharge from the plane and the functioning of the delay action fuse. At periodic intervals along the flight, drops are made by releasing the supporting means within the air lock tube, thus permitting the pack and its associated instrument to fall. The tug upon the static line breaker cords 82 and 84, releasing the pilot parachute and pulls the trigger rod outwardly compressing the firing pin spring 102 and releasing the firing pin after a predetermined travel. It is understood, of course, that the safety cotter pin 116 has been removed. The trigger rod is pulled clear of the assembly, being held by the lanyard 94 as can readily be seen by reference to Figure 6. The firing pin strikes percussion cap 124 and ignites the powder pellet 128. The pilot parachute 78 then supports the assembly as can readily be seen by reference to Figure 5. The pilot parachute will retard the velocity of descent of the assembly sufficiently so that when the main canopy is opened the shock will be insufficient to derange the comparatively sensitive instruments used to obtain the weather data. Furthermore, the pilot parachute will prevent the instrument from assuming a reverse position so that it cannot be sharply jerked or rotated upon the opening of the main parachute. This further avoids an additional hazard of deranging the instruments carried by the parachute. The period of delay, of course, may be varied, depending upon the altitude and the speed of the airplane, the size of the main canopy and the weight of the assembly. These factors may be determined without difficulty. An interesting feature in connection with our fuse is that at high altitude when the atmosphere is rarer and the effect of the parachute is less, the time of delay is automatically increased due to the use of a powder train which gives longer times of burning at high altitude where the atmospheric pressure is less. This is of interest since once the time delay at any altitude is determined, the fuse will automatically give substantially the proper delay at any altitude. With an Ensign Bickford fuse, such as shown in Figure 16, we have found that the burning rate at 30,000 feet is one-third that at sea level.

Figures 5, 6, 7, 8:
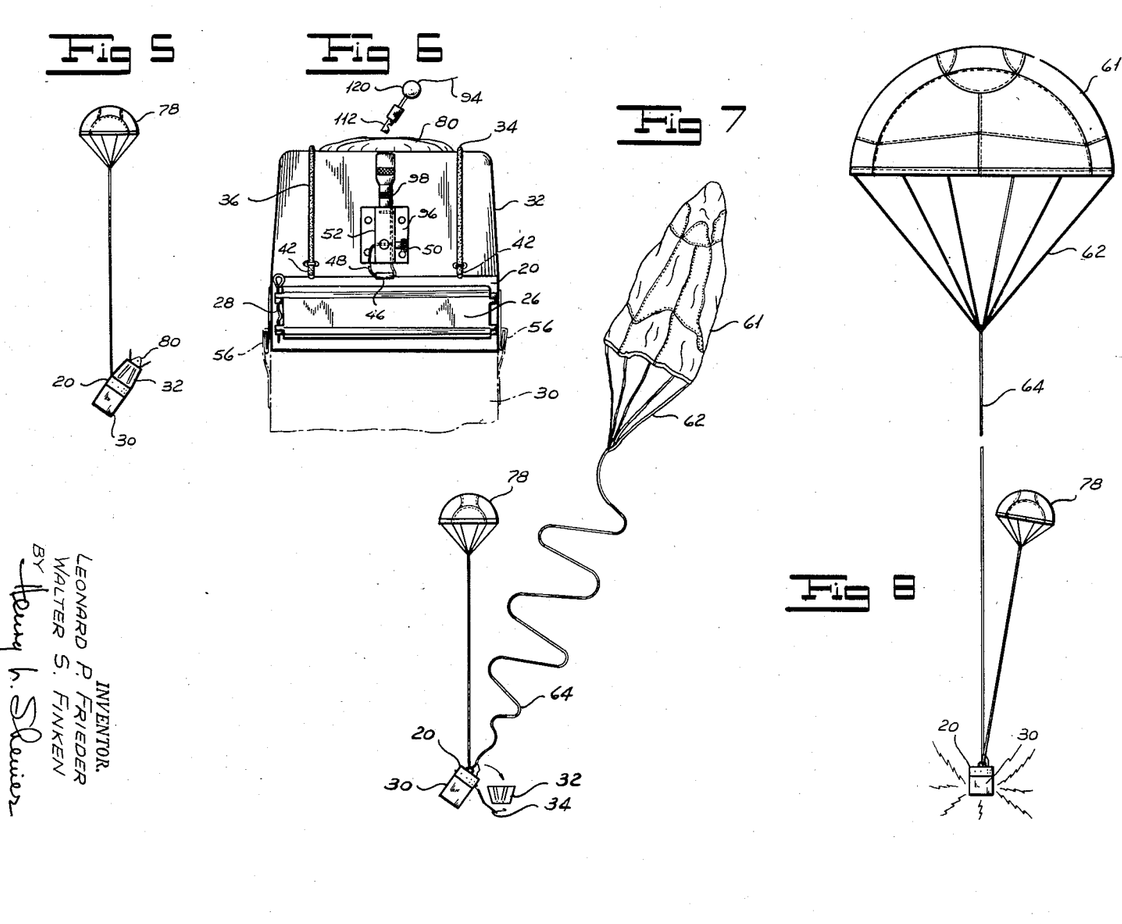
Figure 5 is a view drawn on a very small scale showing the position of the parts after the assembly has been dropped from an airplane, supported by a pilot parachute during the period of delay and before the main parachute has opened.
Figure 6 is a view of parts immediately after the firing mechanism of the fuse has operated.
Figure 7 is an elevation showing the position of parts immediately after the time delay assembly has acted to release the main parachute showing the main parachute in the process of being streamed.
Figure 8 is an elevation showing the position of the parts with the signaling apparatus in operation borne by the main parachute after it has opened.

After the predetermined period of delay has elapsed the latching cord 48 will be severed, permitting the pack cover 32 to be pulled from the parachute assembly by the elastic members 34 and 36. The position of parts shortly after the release of the main canopy is shown in Figure 7. When the load is borne by the main canopy 61, the instrument is set into operation by the closing of the switch due to the tug on lower end of antenna 66 as shown in Figures 10 and 11. The instrument then sends out signals, depending upon its type of construction, relating to wind velocity, temperature, humidity and barometric pressure. These are received by the dropping airplane and transmitted to a central collecting station. The transmitting plane also sends the geographic position of the drop by latitude and longitude as well as the altitude at which the drop took place. The rate of descent is fairly well known and can further be checked by the variation in barometric pressure which is being transmitted by the instrument. The cable 64 is of such length that it will house an antenna in one type of instrument, of approximately one hundred and twenty-five feet in length. The main canopy may have a spread of about five feet and the pilot canopy may have a spread of fourteen inches. It is to be understood of course that any size of parachute and any suitable size pilot canopy may be employed, depending upon the rate of descent desired and the weight of the instrument to be borne by the main canopy.

Where a very heavy instrument is carried and the velocity of the flight is high, a sequential fuse such as shown in Figure 12 may be employed in which a plurality of canopies are opened in succession. The first pellet 128 with its packing pellet 130 will release the pilot canopy 78. The pellet 130 with its packing pellet 166 will release the second canopy 79 which will further slow the speed of descent of the instrument. The pellet 166 and its packing pellet 170 will release the main canopy 61 at which time the speed of descent is sufficiently slow so that the instrument 30 may be set into operation.

Figure 19:
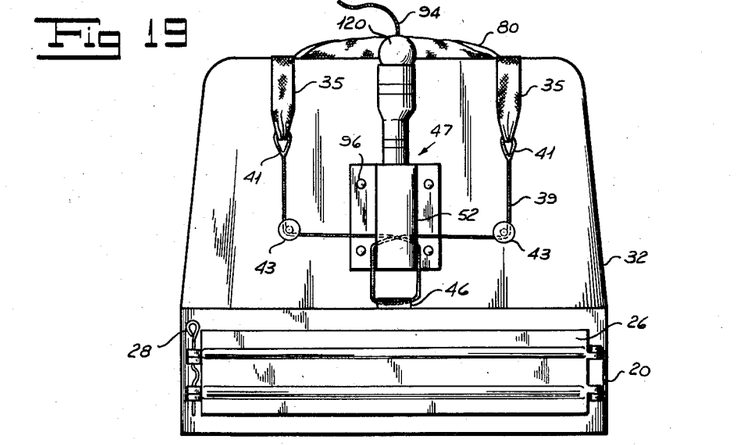
Figure 19 is a front elevation of a parachute pack assembly, showing another embodiment of our invention.
Figure 20:
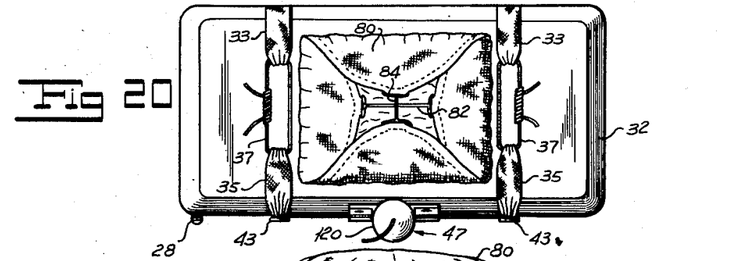
Figure 20 is a top plan view of the pack shown in Figure 19.
Figure 21:
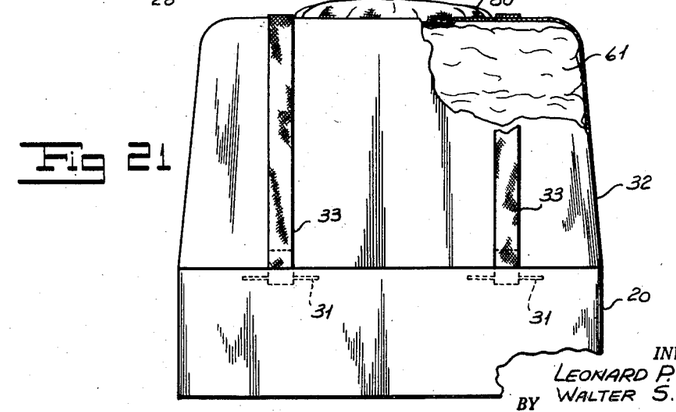
Figure 21 is a rear elevation of the pack shown in Figure 19.

Referring now to Figures 19, 20 and 21, we have shown another embodiment of our packing in which webbing and nylon cord are used instead of the rubber shock cords 36.

The pack cover 32 is secured to the base member 20 by means of a pair of web straps 33 which are secured to the base at the rear thereof by means of pins 31 as can readily be seen by reference to Figure 21. A pair of straps of webbing 35 are joined to the rear webbing straps 33 by means of nylon lashings 37, as can readily be seen by reference to Figure 20. The webbing strap terminating in the loop 46 is firmly secured to the forward portion of the base 20. A nylon cord 39 has its ends formed with eyes 41 which are secured to respective webbing straps 35, as can readily be seen by reference to Figure 19. A pair of fair leads comprising stubs 43 are secured to the pack cover 32. The nylon cord 39 passes between the pellets 128 and 130 (shown in Figure 2) and through the loop 46. By adjusting the lashing 37, the pack cover 32 may be very firmly secured to the base 20 with the parachute of the main canopy folded within the pack similar to the manner shown in Figure 4. We have found that it is not necessary to use the ejection plate 58, as the fabric of the parachute possesses sufficient elasticity to push the pack clear of the base when the nylon cord 39 is burned by the flare of the pellets of the delayed fuse.

It will be seen that we have accomplished the objects of our invention. We have provided a parachute pack which will open only at a predetermined time after being dropped from an airplane. We have provided a novel time delay mechanism which is inexpensive to manufacture and certain in its operation. We have provided a time delay parachute pack having a release assembly with few moving parts and which employs a powder train the time of burning of which determines the time of opening of the pack.

It will be understood that certain features and sub-combinations are of utility and may be employed without reference to other features and sub-combinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, we claim:

1. A delay releasing assembly including in combination a powder pellet adapted to burn a predetermined period of time, means for igniting said pellet to initiate a release action, a second powder pellet spaced from the end of said first pellet and adapted to be ignited by the flare of said first pellet, securing means adapted to be rendered inoperative by the combustion of said first powder pellet and the combustion of said second pellet after a predetermined period of delay to effect the desired release action, said securing means being positioned between the end of said first powder pellet and said second powder pellet, a housing for said pellets and means for venting said housing.

2. A delay releasing assembly including in combination a housing, a first powder pellet adapted to burn a predetermined period of time positioned in said housing, a second powder pellet spaced from said first powder pellet and adapted to be ignited from the terminal flare of said first powder pellet, a securing member adapted to be rendered inoperative by the combustion of said powder pellets positioned therebetween, said housing being formed with a vent for the gases of combustion from the burning of said pellets, a firing pin, a percussion cap adapted to ignite said first pellet, a spring for urging said firing pin to strike said percussion cap, releasable latching means normally holding said firing pin out of engagement with said percussion cap, a means for releasing said latching means to initiate the action of the releasing assembly.

3. A delay releasing assembly as in claim 2 in which said latching means comprises a firing pin stem, a trigger stem, interengaging means formed upon said firing pin stem and said trigger stem respectively, said interengaging means normally being positioned in a bore, said bore being formed with a portion of an enlarged cross-sectional area, and means for pulling said interengaging means into said enlarged bore portion against the action of said spring whereby to permit the disengagement of said interengaging stem portions to free said firing pin.

4. A delay releasing assembly as in claim 2 in which said latching means comprises a firing pin stem, a trigger stem, interengaging means formed upon said firing pin stem and said trigger stem respectively, said interengaging means normally being positioned in a bore, said bore being formed with a portion of an enlarged cross-sectional area, and means for pulling said interengaging means into said enlarged bore portion against the action of said spring whereby to permit the disengagement of said interengaging stem portions to free said firing pin, said means for pulling said interengaging stem portions into the enlarged bore portion comprising a lanyard, means for securing said lanyard to said trigger stem and means carried by said lanyard for sealing said bore.

5. In a delay assembly of the character described, a firing mechanism housing formed with a bore, a spherical seat formed at the end of the bore, a trigger stem positioned in said bore, a lanyard secured to said trigger stem and a spherical sealing member carried by said lanyard adapted to rest on said seat to seal said bore.

6. A delay assembly as in claim 5 in which said sealing member is formed with spherical portion and cylindrical portion, said spherical portion being adapted to seat over said bore entrance, said cylindrical portion being pressed around said lanyard.

7. A delay releasing assembly including in combination a housing, a parachute positioned in said housing, means for opening said housing to free said parachute, securing means normally holding said housing in closed position, a powder train adapted to burn a predetermined period of time, means for igniting said train to initiate a released action, said securing means having a portion adapted to be rendered inoperative by the combustion of said powder train after a predetermined period of delay, said portion being positioned adjacent the end of said powder train, a radio signaling device carried by said parachute, a suspension line for supporting said radio signaling device from the parachute and a radio antenna wire lodged within said suspension line.

8. A delay releasing assembly including in combination a housing, a parachute positioned in said housing, means for opening said housing to free said parachute, securing means normally holding said housing in closed position, a powder train adapted to burn a predetermined period of time, means for igniting said train to initiate a release action, said securing means having a portion adapted to be rendered inoperative by the combustion of said powder train after a predetermined period of delay, said portion being positioned adjacent the end of said powder train, a radio signaling device carried by said parachute, a suspension line for supporting said radio signaling device from the parachute, a radio antenna wire lodged within said suspension line, a means responsive to the imposition of a load upon said line for initiating the action of said radio signaling device.

9. A delay releasing assembly including in combination a housing, a parachute positioned in said housing, means for opening said housing to free said parachute, a securing means normally holding the housing in closed position, a time delay means, means responsive to said time delay means for rendering said securing means inoperative whereby to release said parachute, a radio signaling device carried by said parachute, a suspension line for supporting said radio signal device from the parachute and a radio antenna wire lodged within said suspension line.

10. A delay releasing assembly including in combination a housing, a parachute positioned in said housing, means for opening said housing to free said parachute, a securing means normally holding the housing in closed position, a time delay means, means responsive to said time delay means for rendering said securing means inoperative whereby to release said parachute, a radio signaling device carried by said parachute, a suspension line for supporting said radio signal device from the parachute, a radio antenna wire lodged within said suspension line and means responsive to the imposition of a load upon said line for initiating the action of said radio signaling device.

11. In a device of the character described a suspension line carried by a parachute for supporting a radio signaling device and a radio antenna wire lodged within said suspension line.

12. A delay opening parachute pack adapted to be dropped from an aircraft, including in combination a housing, a parachute positioned in the housing, means for opening the housing to free the parachute, a securing means normally holding the housing in closed position, said securing means comprising a member adapted to be rendered inoperative by heat of combustion, a powder train adapted to burn a predetermined period of time, a housing for said powder train, means for positioning said securing member adjacent the end of the powder train whereby combustion of the train will render said securing member inoperative after a predetermined period of time whereby to release the parachute, a vent for said housing, means for igniting the train to initiate the release action, said means including a lanyard, and means for securing the lanyard to an aircraft, the arrangement being such that when said assembly is dropped the pull on said lanyard will initiate the release action.

13. A delay opening parachute pack as in claim 12 in which there is a second powder train positioned in said powder train housing spaced from said first train and adapted to be ignited by the combustion of said first train, said securing member being positioned between the trains.

14. A delay opening parachute pack as in claim 12 in which said powder train comprises a powder pellet.

15. A delay opening parachute pack as in claim 12 in which said securing member comprises combustible material.

16. A delay opening parachute pack as in claim 12 in which said securing member comprises fusible material.

WALTER S. FINKEN.
LEONARD P. FRIEDER.

REFERENCES CITED

The following references are of record in the file of this patent:

UNITED STATES PATENTS

| Number | Name | Date |
| --- | --- | --- |
| 286,718 | Linton | Oct. 16, 1883 |
| 1,683,940 | Wiley | Sept. 11, 1928 |
| 1,771,455 | Wiley | July 29, 1930 |
| 1,834,840 | Holt | Dec. 1, 1931 |
| 1,836,633 | Tritschler | Dec. 15, 1931 |
| 1,843,597 | Coffman | Feb. 2, 1932 |
| 2,398,744 | Jalbert | Apr. 16, 1946 |
| 2,402,143 | Arenstein | June 18, 1946 |
| 2,402,716 | Whitsett | June 25, 1946 |
| 2,478,866 | Freas | Aug. 9, 1949 |

FOREIGN PATENTS

| Number | Country | Date |
| --- | --- | --- |
| 130,406 | Great Britain | Aug. 7, 1919 |
| 300,217 | Great Britain | Nov. 5, 1928 |
| 214,900 | Germany | Oct. 9, 1909 |